US007931709B2

(12) United States Patent
Franz et al.

(10) Patent No.: US 7,931,709 B2
(45) Date of Patent: Apr. 26, 2011

(54) PROCESS AND APPARATUS FOR GENERATING HYDROGEN

(75) Inventors: Marcus Franz, Schwabmuchen (DE); Georg Hartel, Freiberg (DE); Jurgen Kunzel, Thierhaupten (DE)

(73) Assignee: SGL Carbon AG, Wiesbaden (DE)

( * ) Notice: Subject to any disclaimer, the term of this patent is extended or adjusted under 35 U.S.C. 154(b) by 0 days.

(21) Appl. No.: 11/869,577

(22) Filed: Oct. 9, 2007

(65) Prior Publication Data

US 2008/0031800 A1 Feb. 7, 2008

Related U.S. Application Data

(62) Division of application No. 10/613,979, filed on Jul. 3, 2003, now abandoned.

(30) Foreign Application Priority Data

Jul. 4, 2002 (DE) ................................ 102 30 149

(51) Int. Cl.
*B01J 7/00* (2006.01)
*B01J 8/04* (2006.01)

(52) U.S. Cl. ............. 48/61; 48/127.9; 48/117; 422/187; 422/188; 422/189; 422/190; 422/191; 422/193

(58) Field of Classification Search .............. 431/7, 170, 431/75, 80
See application file for complete search history.

(56) References Cited

U.S. PATENT DOCUMENTS

| 4,375,949 A | * | 3/1983 | Salooja | ............................ | 431/7 |
| 5,165,884 A | * | 11/1992 | Martin et al. | ..................... | 431/7 |
| 5,522,723 A | | 6/1996 | Durst et al. | | |
| 5,890,886 A | | 4/1999 | Doker et al. | | |
| 2002/0000066 A1 | | 1/2002 | Bentley et al. | | |
| 2002/0042035 A1 | | 4/2002 | Komiya et al. | | |

FOREIGN PATENT DOCUMENTS

DE 25 21 710 11/1976

(Continued)

*Primary Examiner* — Alexa D. Neckel
*Assistant Examiner* — Kaity V. Handal
(74) *Attorney, Agent, or Firm* — Leason Ellis LLP

(57) ABSTRACT

A process is described for generating hydrogen through the oxidation of fuels that contain chemically bound hydrogen, in particular hydrocarbons, having the following process steps: a) introducing the fuel (1) as well as the oxidation agent (2) into a reactor (3) having a porous material (4') that is embodied in such a way that flame propagation in a direction opposite the direction of flow is prevented, and b) reacting the fuel with the oxidation agent in partial oxidation so that hydrogen is obtained in gaseous form. In addition, an apparatus for generating hydrogen that has a reactor that contains a porous material (4, 4'), and the reactor (3) is embodied as a tubular reactor that has a central chamber (5) to introduce the fuel and the oxidation agent that extends in the axial direction and is delimited radially toward the outside by a first wall that has porous material (4), and the first wall is delimited radially toward the outside by a second wall that contains the porous material (4'). Also described is an apparatus to generate hydrogen that has a reactor that contains a porous material and is characterized by the fact that its porosity in the direction of flame generation changes so that the pores are larger, that the porous material is disposed in a first zone and a second zone, which zones are adjacent to each other, and that a zone that has a porous material follows the one zone, seen in the direction of flow.

5 Claims, 5 Drawing Sheets

FOREIGN PATENT DOCUMENTS

| | | |
|---|---|---|
| DE | 26 14 670 | 10/1977 |
| DE | 38 10521 A1 | 10/1988 |
| DE | 38 75 305 A1 | 2/1989 |
| DE | 37 29 114 A1 | 3/1989 |
| DE | 43 22 109 C2 | 1/1995 |
| DE | 195 27 583 A1 | 1/1997 |
| DE | 695 06 869 A1 | 12/1998 |
| DE | 695 14 525 A1 | 1/2000 |
| DE | 698 06 760 A1 | 7/2002 |
| EP | 0367352 | 5/1990 |
| WO | WO-98/21523 A2 | 5/1998 |

* cited by examiner

PROCESS AND APPARATUS FOR GENERATING HYDROGEN

RELATED APPLICATION

This application is a divisional of U.S. application Ser. No. 10/613,979, filed Jul. 3, 2003, which claims the priority of German patent application 102 30 149.2, filed Jul. 4, 2002.

The invention relates to a process for generating hydrogen by means of the oxidation of fuels that contain chemically bound hydrogen, in particular of hydrocarbons, as well as apparatuses suitable for performing the process.

In the prior art, the generation of hydrogen is generally accomplished through the partial oxidation of hydrocarbons, for example methane, propane, natural gas, liquid hydrocarbons, or low-molecular-weight alcohols, etc. In general, the following equation may be used for the partial oxidation of a hydrocarbon with oxygen to generate hydrogen:

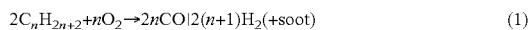

$$2C_nH_{2n+2} + nO_2 \rightarrow 2nCO + 2(n+1)H_2 (+\text{soot}) \quad (1)$$

(See for example; Büchner, Schliebs, Winter, Büchel, *Industrielle Anorganische Chemie* [Industrial Inorganic Chemistry], 2nd revised edition, VCH Verlagsgesellschaft mbH, D-6940 Weinheim, 1986, pp. 37 ff.) The combustion temperatures that are cited are generally from 1200° C. to 1500° C. In order to counteract the formation of soot that is generally observed, oxidation agents that have a higher oxygen content than air are used in the prior-art industrial processes. It is not, however, always possible to avoid the formation of soot as an unwanted byproduct. A possible reason for this is that the reactants are not adequately mixed together if the reaction is performed with free flame formation, so that localized oxygen deficiencies can occur. In addition, the temperature gradient at the edge of the flame is relatively high. Thus, complete conversion of the reactants is no longer possible at the cooler edge of the flame. This problem occurs with the partial combustion of a hydrocarbon in an even more pronounced manner because here the reaction mechanism—namely the suppression of the oxidation of CO to form $CO_2$-results in lower, temperatures and, thus, a slowing of the reaction. This mainly occurs at the colder periphery of the flame or combustion chamber.

The formation of soot can be counteracted by enriching the combustion air with oxygen or by using pure oxygen as the oxidation agent. This measure causes the combustion temperature to increase, and the formation of soot is reduced. however, the use of pure oxygen or air enriched with oxygen involves additional complexity from a chemical engineering standpoint and higher costs.

In general, with various processes to produce hydrogen the highest possible hydrogen yield is sought. As a result, one of the requirements is to have the lowest possible fuel/air ratio $\lambda$. When methane is used as the fuel, the minimum value for $\lambda$ is 0.25, based on the above equation (1). But here we encounter the problem that with a low $\lambda$ soot is formed. Thus, the demands for the least possible soot formation and the greatest possible hydrogen yield are opposed to each other. One of the goals in any process used to generate hydrogen is to meet both of these requirements to the greatest extent possible—in other words, to keep $\lambda$ as low as possible without forming soot.

EP 0 553 924 describes a partial oxidation process in which a fixed bed is preheated in a first step. Then a stream of hydrocarbons is passed through the hot fixed bed, which causes the soot to be deposited on the fixed bed at the desired low $\lambda$ values. Starting at a certain temperature level, largely pure hydrogen is then passed over the soot that has deposited on the fixed bed, and as a result the soot is oxidized. One disadvantage of this process for producing hydrogen is that it discontinuous. In addition, the process requires pure oxygen as the oxidation agent.

The problem of soot formation with the partial oxidation of hydrocarbons has been studied on numerous occasions in the past. In particular, the phenomenon of soot formation was studied as a function of the stoichiometric ratio $\Phi$ between the actual amount of fuel and the stoichiometrically ideal amount of fuel or as a function of its reciprocal value, the fuel/air ratio $\lambda$. Examples of such studies include the following scientific articles:

Kremer, M. Flamme (1984), "Unterstöchiomiietrische Verbrennung von Kohlenwasserstoffgasen zur Schutzgaserzeugung" [Substoichiometric Combustion of Hydrocarbon Gases to Generate Inert Gas"], *GWF-Gas/Erdgas*, vol. 125, no. 4, pp. 187-193. In this article, the soot formation limit when methane or natural gas is used without air preheating is given as $\lambda=0.6$. When the air is preheated to 400° C., this limit decreases to a value of $\lambda=0.51$.

H. F. Calcote, D. B. Olson (1982), "Importance of Temperature on Soot Formation in Premixed Fllames," *Combustion Science and Technology*, vol. 28, pp. 315-317. In this article, the increased tendency to form soot with fuels at higher flame temperatures is described, in addition to the familiar interrelationships.

A. Jess (1991). "Synthesegaserzeugung durch katalytische partielle Oxidation von Methan mit Luft" [Synthesis Gas Generation Through Catalytic Partial Oxidation of Methane with Air], dissertation Fridericiana University of Karlsruhe. In this study, the soot formation limit using a high-turbulence vortex burner was studied. When methane was used as the hydrocarbon and the air was not preheated, soot formation limit was $\lambda=0.6$. For kinetic reasons, the theoretical limit is stated as $\lambda=0.46$. This study describes how soot formation increases at adiabatic temperatures up to 1400° C., while it then begins to decrease at even higher temperatures.

H. F. Calcote, D. M. Manos (1983), "Effect of Molecular Structure on Incipient Soot Formation," *Combustion and Flame*, vol. 49, pp. 289-304. This article provides an overview of the soot formation limits with various fuels.

From the studies cited above, it can be assumed that the practicable fuel/air ratios $\lambda$ in a process using partial oxidation generally have a minimum value below which soot begins to form. When methane is burned, this minimum fuel/air ratio limit lies between 0.55 and 0.66 according to the literature. Because of the deposition of soot in such equipment, partial oxidation processes cannot be used below this limit.

The articles cited above show that the lower fuel/air limit of the formation of soot decreases as the flame temperature increases with the same fuel (for example with air preheating and/or combustion at lower nitrogen concentrations=oxygen enrichment), while when various fuels are used, a fuel-dependent increase in the flame temperature also causes the fuel/air limit for soot formation to increase. These dependencies only apply in cases in which the fuels are already premixed with air at the beginning of the process. By contrast, in diffusion flames there is an increased tendency for soot formation upon an increase in the reaction temperature.

One possible way to prevent the formation of soot is to use catalysts. This also allows the hydrogen yield to be increased. Lower fuel/air ratios than those referred to above can be achieved when catalysts are used. Processes of this type are referred to, for example, in the following articles:

S. Frini, C. Calogero, S. Cavallaro (2000), "Hydrogen production from methane through catalytic partial oxidation reactions," *Journal of Power Sources*, vol. 87, pp. 28-38. C. R.

H. de Smet et al. (2001), "Design of adiabatic fixed bed reactors for the partial oxidation of methane to synthesis gas. Application to production of methanol and hydrogen for fuel cells," *Chemical Engineering Science*, vol. 56, pp. 4849-4861.

However, other disadvantages are encountered when catalysts are used, such as "catalyst poisoning," the sensitivity of catalysts to excessive temperatures, contaminants such as sulfur and its compounds, and very low soot concentrations. In addition, reactors using catalysts require special start-up procedures.

In the article "Hydrogen Production by Methane-Rich Combustion in a Ceramic Burner," *Journal of Chemical Engineering of Japan*, vol. 35, no. 1, pp. 46-56, a process utilizing partial oxidation in which the reactor is configured as a radiant surface burner is described. The radiant surface burner consists of a fine porous structure. No catalyst is used. In the reactor that is described, most of the combustion reactions occur outside the porous body, as is typical of radiant surface burners. In this process, the soot formation limit when methane is burned is $\lambda=0.66$. Experiments were also performed with a lower fuel/air ratio ($\lambda=0.5$) in order to increase the hydrogen yield. However, soot was formed at this level. The fact that the soot formation limit involves a higher fuel/air ratio compared with reactors in which there is free flame formation is because in radiant surface burners the reaction zone experiences cooling due to the radiation of heat from the burner surface.

The object of the invention is to provide a process for generating hydrogen through the oxidation of fuels containing chemically bound hydrogen in which the formation of soot is avoided, even at low fuel/air ratios, and at the same time a high hydrogen yield is obtained. Another object of the present invention is to characterize a reactor suitable for the process.

The object of the invention is accomplished by a process of claim 1, and by a reactor of claims 19 or 29, respectively.

The process of the invention to produce hydrogen by means of the oxidation of fuels that contain chemically bound hydrogen, in particular hydrocarbons, has the following process steps: a) feeding the fuel that contains chemically bound hydrogen, as well as the oxidation agent, into a reactor having a porous material that is designed in such a way that flame propagation in the opposite direction from the flow of the fuel is prevented; b) reacting the fuel with the oxidation agent in partial oxidation, so that the hydrogen is obtained in gaseous form.

In the present invention, "partial oxidation" of hydrocarbon-containing fuels means any reaction in which the fuel/air ratio is less than 1.

There are various ways to stabilize combustion reactions in porous materials, and they basically can be divided into two different categories:

The first option is to stabilize the combustion by means of fluid technology in such a way that the flow velocity at a given location in the burner is greater than the flame propagation velocity in order to prevent the undesirable propagation of flames in the direction opposite to that of the flow of fuel (U.S. Pat. No. 755,376, Ser. No. 70,230, U.S. Pat. No. 755,377, Ser. No. 70,230, both C. E. Lucke; both 1901: German patent 1,303,596, 1966). This can be accomplished, for example, by an abrupt widening of cross section, upstream from which the flow velocity is greater than the flame propagation velocity, and downstream from which the flow velocity is smaller. The same principle also works with a gradual increase in cross section, with the difference being that the flame stabilizes at different locations, depending on the flow velocity (U.S. Pat. No. 1,015,261 to W. A. Bone, Ser. No. 595,438, issued Jan. 16, 1912). Another way to utilize the difference between the flame propagation velocity and the flow velocity is the variable adjustment of different flows of gas and air, for example using temperature measurements in porous materials (U.S. Pat. No. 5,165,884, dated 1992; EP 524736 A2, dated 1993).

The second way to stabilize combustion reactions in porous media is to sufficiently cool the gas mixture just upstream from the desired combustion site. This can be accomplished, for example, by means of active cooling measures such as water-cooled pipes (U.S. Pat. No. 1,225,381, Ser. No. 11,365) or by cooling surfaces (Schwank, G. *Gasheizung und Strahlung*, vol. 90, no. 8, 1949, pp. 169-174). A specific and advantageous way to stabilize combustion reactions in porous media based on thermal effects is that for the propagation of the flame in a porous structure there must be a certain minimum ratio between the heat produced by the combustion and the heat removed by the surrounding medium. This ratio can be stated by a modified Péclet number Pe, which is not formed with the flow velocity, but rather by the laminar flame velocity of the fuel/air mixture $S_1$ $$Pe - \frac{S_1 d_{P,eff} \rho_f c_{p,f}}{\lambda_f} - \frac{S_1 d_{P,eff}}{a_f} \qquad (2)$$

In addition, an effective pore size $d_{P,eff}$ as well as the thermal conductance of the gas mixture all as a material property are used in Equation (2). There exists a critical Péclet number, which for hydrocarbons generally has a value of about 65, above which flame propagation is possible in porous material and below which, however, the flame is extinguished. In the process of the invention, as a result of the increase in the pore size in the direction of flow there initially is a zone (having a small pore size) in which the Péclet number is sub-critical and in which the flames are extinguished. As the pore size increases, a zone having a supercritical Péclet number is produced, in which the flames can propagate. By means of this method of stabilization, a sell-stabilizing flame wave can be generated in the process of the invention. This option for achieving combustion stabilization in a porous burner is described, for example, in EP 0657011 B1, and it often appears to be advantageous, since stabilization is possible within a broad range, independent of the flow velocity, which thereby permits a broad range of throughputs.

The use of an open-celled macroporous material having a changing pore size that has a critical Péclet number on an internal boundary surface permits extremely stable process management, even at comparatively low fuel/air ratios, without producing soot. In this way, the hydrogen concentration that is produced as well as the hydrogen yield can be increased. This results in a decrease in the combustion temperature, and therefore also the reactor temperature, so that, for example, metallic materials in the form of open-celled macroporous material can be used. It was found that the fuel/air ratio below which soot begins to form can be lowered to values of about $\lambda=0.45$, and even lower, without the use of catalysts. Extrapolation of the values that were determined allows one to expect that if the process described above is optimized systematically, values of $\lambda=0.4$ can even be achieved without catalyst. These astonishingly low values are apparently due to the heat transport mechanisms prevailing inside the porous material. By using open-celled microporous material having the stated characteristics, the homogeneity of the temperature matrix within the combustion zone is increased. This permits a mode of operation that is much closer to the soot limit than in other reactors that are subject to larger temperature and concentration variations. In addition, the oxidative reaction of soot precursors increases faster at higher temperatures than their rates of formation. This is the general reason why the lower fuel/air ratio limit for the formation of soot decreases as the flame temperature increases with the same fuel. However, if soot nuclei are present in an open-flame reactor used for partial oxidation, their temperature decreases abruptly due to free radiation, which contributes to the formation of soot. In a stabilized porous reactor such as that used in the process of the invention, on the other hand, all soot precursors are in a thermal equilibrium with the porous structure, which is why soot nuclei cannot cool down as the result of free heat radiation.

The open-celled microporous material used in the process of the invention can have a continuous transition from small-diameter pores to larger diameter pores in the interior of the reactor, so that then the flame propagation begins at a characteristic pore diameter having the critical Péclet number. When different fuel/air mixtures are used, the critical Péclet number can also vary. With a continuous increase in the pore size of the porous material, this would have the disadvantage that the flame could move tinder different conditions. In order to establish a defined position for flame development, it is therefore advantageous that two zones of different pore size located adjacent to one another be present, and that the first zone located downstream from the inlet have a Péclet number for flame development that is smaller than the critical Péclet number and the second zone further downstream from the inlet have a Péclet number that is larger than the critical Péclet number. As a result of this measure, the generation of the flame is restricted to the surface or to the area between the two zones and is essentially independent of operating parameters that could result in a variation of the critical Péclet number. The measure to define the site of flame creation referred to above therefore further increases stability. See EP 0 657 011 for further details regarding the configuration of the zones in the reactor.

The process of the invention allows ambient air to be used as the oxidation agent. Enrichment with oxygen is not necessary. In general, a hydrogen yield relative to the hydrogen bound in the fuels of at least 70% can be achieved without generating soot. The use of air has the advantage of offering particularly economical process management, and it has the further advantage of producing low adiabatic combustion temperatures. The process of the invention even allows the reaction to be maintained at a temperature level near the minimum ignition temperature for the reaction mixture. Of course, it is also possible to use oxygen or air enriched with oxygen as the oxidation agent.

In a preferred embodiment of the process of the invention, the heat that is given off resulting from step b) is used to preheat the oxidation agent and/or the hydrogen-containing fuel. The preheating can be accomplished, for example, by means of a heat exchanger embedded in the hot reaction zone, or placed in the hot gas stream, through which the oxidation agent and/or the hydrogen-containing fuel is directed. Another way to accomplish preheating is to design the first zone, which serves as a flame barrier, in such a way with regard to its heat transfer characteristics that a sufficient part of the heat of reaction is removed directly out of the reaction zone in the direction opposite the direction of flow. Using this heat, the educt mixture flowing through the flame barrier can be heated within the flame barrier before the reaction zone is reached. A combination of both preheating techniques is also possible. In this way, the reaction temperature can be controlled in such a way that the hydrogen yield is optimized. This is because the chemical equilibrium is shifted into the range having a desired high hydrogen yield solely based on the temperature increase, which is why the chemical composition of the fuel and/or the oxidation agent does not need to be changed.

Since the porous material itself offers resistance to the gas flow, the process of the invention can essentially be used in a wide range of pressures. In particular, in step b) pressures from about 0.3 bar to 20 bar absolute are possible—in other words in a range from vacuum to high pressure.

In addition to the usual hydrogen-containing fuels such as methane, propane, or natural gas, or liquid hydrocarbons, alcohols can also be used in the process of the invention, in particular low-molecular-weight alcohols.

In an additional preferred embodiment of the process of the invention in step b) the CO that results is reacted with steam to form $CO_2$ with water vapor in a further step c). This generates additional hydrogen and prevents the formation of toxic CO.

Steps b) and c) are preferably performed in different reactor zones. This means that steps b) and c) are separate from each other, both spatially as well as in their chronological order. The process of the invention can be performed continuously, so that it is not necessary to interrupt the course of the project.

Based on the already described properties of the porous material with respect to heat transfer or to the generation of a homogeneous temperature matrix, it is preferred that the zone used to perform step c) also contain porous material.

As is known, a minimum temperature must be present in order to react CO into $CO_2$. In a preferred embodiment of the process of the invention, this temperature at least partially comes from the heat energy that is formed in step b) and that is contained in the gases. Heat can be removed from porous structures particularly well. For example, it is possible to connect the porous materials in the zones in steps b) and c) to each other by means of a conventional heat exchanger. Of course, the heat produced in step b) can also be used in some other way.

In order to react the CO to $CO_2$, steam can be introduced prior to step c). The steam is preferably introduced between the zone in which step b) is performed and the zone in which step c) is performed. Ache introduction of steam (steam reforming) has the further advantage of increasing the hydrogen yield further.

A further improvement in efficiency can be achieved by using a catalyst when performing step b) and/or step c). Thus, for example, a catalytic coating on the porous material is conceivable. If the process of the invention is performed with a catalytically coated combustion zone, in this case the stabilization of combustion is significantly better than when the process is performed with a conventional catalytic reactor. The use of a catalyst in step c) also allows the selectivity of the oxidation reaction to be controlled better.

In one embodiment, the open-celled macroporous material of at least one of the zones of the reactor can contain a fixed bed of ceramic refractory materials. Conceivable porous materials used in this regard are, for example, ceramic packing bodies in the form of rings, balls, open-celled foams, or also in the form of other regular ceramic structures.

In one alternative, the porous material of at least one of the zones of the reactor can also contain a structured metal. Metal has the advantage of having particularly high thermal conductivity, so that a homogeneous temperature matrix is quickly established. Conceivable metal structures include, for example, lattices, screens, mixer structures, or open-celled metal foams.

The process of the invention can be used for numerous applications, i.e., chemical engineering. For example, the hydrogen can be generated for various large-scale chemical processes, such as increasing the mass flow of $H_2$ in HCl synthesis plants, as well as $H_2$ generation in compact plants in order to meet peak-load requirements.

A further area for the use of the process of the invention that is becoming increasingly important is in the preparation of fuel for fuel cells (FCs). Fuel cells are typically used in small and medium sizes in automotive vehicles as well as for the decentralized generation of electrical power and heat, and they are currently in the advanced stage of development. The process of the invention can be used advantageously in this application in particular. In order to generate the hydrogen required by the fuel cell, a so-called reformer is typically used. Depending on the fuel cell and reformer type, a "starting burner" is needed to bring the fuel cell temperature and the fuel and reformer equipment to the necessary starting temperature. When the process of the invention is used as the reformer, such a starting burner is not needed for the fuel cell. All that is needed is to modify the process when the system is started so that superstoichiometric conditions prevail for the oxidation. After the system start, the system can be shifted to substoichiometric operation, so that the entire reformer process or a part of it is carried out by means of the process of the invention.

When the same porous structures as those in the process of the invention are used, combustion of the combustible residue gases from the fuel cell and the reformer can burn in a safe and stable manner.

An especially suitable device for generating hydrogen by means of the oxidation of fuels that contain chemically bound hydrogen has a reactor that contains a porous material, this reactor being designed as a tubular reactor having a central chamber for introducing the fuel and the oxidation agent that extends in the axial direction and is radially delimited on the exterior by a first wall consisting of porous material, whereby the first wall is delimited radially on the exterior by a second wall that contains an additional porous material.

As already noted in conjunction with the process of the invention, a stabilization of tile reactor of the invention can be accomplished if the material has fine holes, so that the rate of flow in the material or in the holes prevents the flame from traveling in the direction opposite to flow.

In one alternative, the pore size of the macroporous open-celled material can change to larger-sized pores in the direction of flame development. In this case, a boundary surface within the porous material can have a critical Péclet number above which flame generation occurs and below which it is suppressed.

In the reactor of the invention, the two porous materials on whose boundary surface the critical Péclet number is established are adjacent to each other and are disposed concentrically about the central longitudinal axis of the tubular reactor. To perform the reaction, the oxidation agent as well as the fuel are fed into the central chamber, and then they flow through the two porous walls radially toward the outside. Within the first wall, the Péclet number is smaller than the critical value, which is why flame propagation is not possible. Within the second porous material of the second wall, the Péclet number is larger than the critical value, so that combustion can occur.

The reaction products can be brought together in an open space that is delimited radially on the inside by the second wall and is delimited radially on the outside by an outer wall. The chamber thus extends essentially concentric to the walls and to the inner hollow chamber. From this chamber, the reaction product can be transported in an axial or radial direction out of the reactor.

In a preferred embodiment, the outer wall is embodied as a double tube in order to accept a coolant. In this way, the resulting gases can be cooled before they leave the reactor. The double tube can be advantageously equipped with ribs on the reactor side, so that the heat from the reaction mixture (not shown) can be removed better.

In order to subsequently react the CO that results in the process of the invention, the apparatus of the invention preferably has an additional wall made of a porous material that extends at a given distance radially toward the exterior and essentially parallel to the second wall. In other words, a concentric chamber is formed between the second and third wall. Pipes to supply oxygen-containing gases and/or steam, for example, can lead into this chamber. The gases or steam that are fed flow radially toward the exterior through the third wall together with the product gases from the partial oxidation reaction.

In order to allow the process of the invention to proceed catalytically, the porous material of the second wall can contain catalytically active structures. For example, the porous material may have a catalytic coating. Similarly, it is also possible to configure the porous material of the third wall with a catalytically active structure that is able to use steam to react CO to form $H_2$ and $CO_2$.

In order to be able to use catalysts that are also effective at temperatures below the reaction temperature, an intermediate cooling system is provided, preferably between the first and second wall. This cooling system can be configured as a tube wound around the exterior of the second wall in the form of an extended spiral. Of course, other configurations of a cooling tube are conceivable in the space between the second and third wall, in order to adjust the temperatures to advantageous values.

The hydrogen gas that is generated is frequently required in pure form. In this case, a membrane that is only permeable to hydrogen gas is disposed in the apparatus of the invention between the outer wall and the adjacent inner wall. This membrane, however, is not permeable to the other products resulting in the reaction. Suitable membranes are, for example, metal membranes of the platinum group, preferably of palladium. In one alternative, however, it is also possible to clean the resulting hydrogen gas with the help of conventional processes (for example, after separation of $CO/CO_2$ by means of low-temperature rectification).

A further apparatus of the invention for generating hydrogen through the oxidation of fuels that contain chemically bound hydrogen has a reactor that contains a porous mass whose pore size changes so that the pores become larger in the direction of flame development, whereby a boundary surface within the porous material has a critical Péclet number above which flame development occurs and below which it is suppressed, whereby the porous material is arranged into a first zone and a second zone, and whereby, seen in the direction of flow, a third zone is provided downstream and also contains a porous material. The individual zones may, unlike the reactor described above, be disposed linearly in series, so that in this case the direction of flow proceeds in an axial direction through the reactor. In this type of reactor as well, the actual oxidation reaction occurs within the second zone, and the first zone, which contains the porous material having the subcritical Péclet number, serves as a flame barrier. In the third zone, the resulting CO is reformed to $CO_2$, and is spatially separate from the main reactor. For this reason, the entire reaction process can be run simultaneously, so that it is not necessary to interrupt the reaction process flow. However, because the porous flow from the third zone is located within the reaction mixture in the reactor, however, a very compact design is possible.

An intermediate space is preferably disposed between the second and third zone, and into this space a pipe for introducing gas and/or steam is disposed. Here, the reaction of CO to form $CO_2$ is supported by the introduction of oxygen-containing gas and/or steam, as already described in conjunction with the process of the invention.

If use of a catalyst is desired, the porous material of the second and/or third zone can also contain catalytically active structures in this case.

In order to remove the heat of reaction that results in the oxidation reaction that occurs in the second zone, the apparatus of the invention preferably has a heat exchanger pipe. The heat exchanger pipe can be used, for example, to transfer the resulting heat to the incoming fuel and/or the incoming oxidation agents. In addition, the pipe can be used to heat the third zone within which the oxidation of CO to $CO_2$ (with $H_2O$ steam) occurs, thus providing the necessary activation energy for this reaction.

In general it must be noted that the porous structure in the reaction chamber plays a key role for the transport of heat in the reactors of the invention. In this regard, materials that have a high radiation intensity already at low temperatures-in other words, that increase the transfer of heat—have been found to be advantageous for the porous structure. Metals in spherical form, knitted fabrics or orifice diaphragms and other porous bodies, open-celled foams (in particular in small pieces of equipment), and fixed beds or stratified beds can be considered, such as are generally used in thermal processing technology. Ceramic materials that are based on Mg, Ca, Al, Si, or Zr oxide and compounds thereof have been found to be particularly suitable. Nitrides and carbides can also be used in this conjunction. The possible configurations of the packing materials are extremely varied, however preferably Hiflow rings, saddle packing, balls, and cylindrical packing are used.

The apparatuses of the invention can be used as combined starting burners and reform burners to prepare the fuel for fuel cells. Detailed design options for these apparatuses have already been described in combination with the process of the invention.

We shall now explain the invention in greater detail below based on examples of embodiments and with reference to the attached drawings.

DETAILED DESCRIPTION OF PREFERRED EMBODIMENTS

Figure 1:
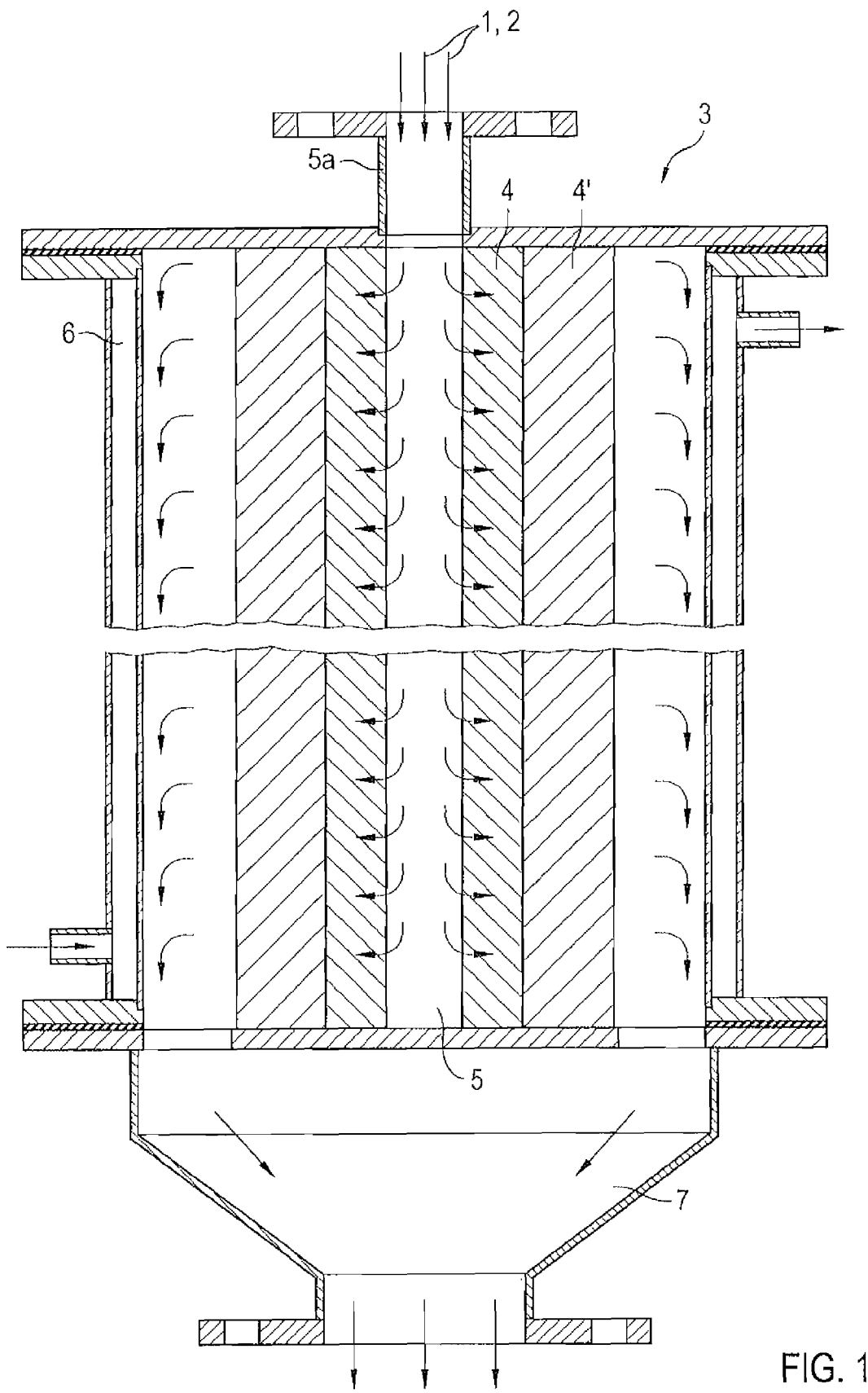
FIG. 1 A first embodiment of an apparatus of the invention for generating hydrogen through the oxidation of hydrocarbon-containing fuels shown in a sectional view.
Figure 2A:
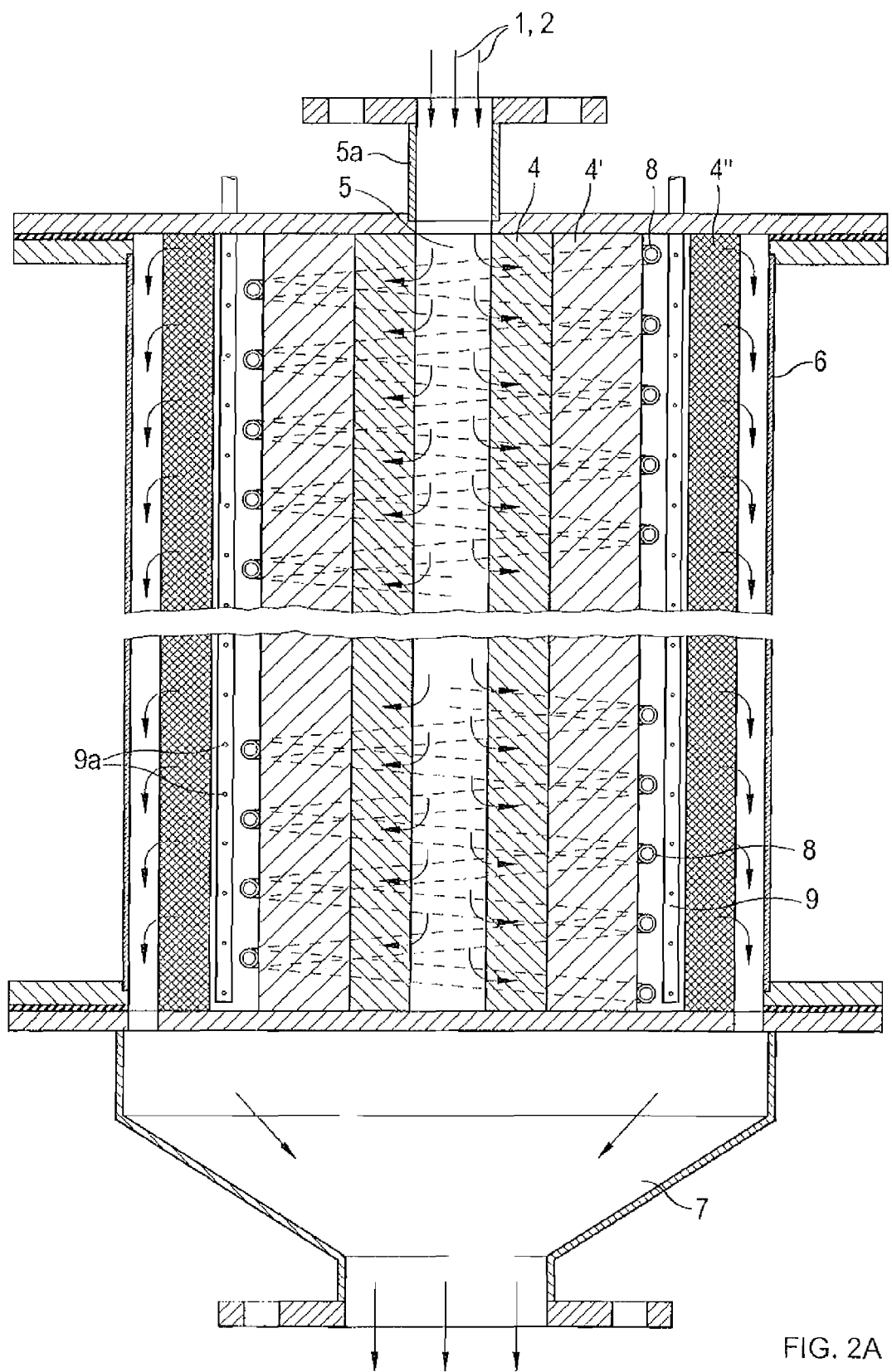
FIG. 2*a* A modified embodiment of the apparatus of FIG. 1, shown in a sectional view.
Figure 2B:
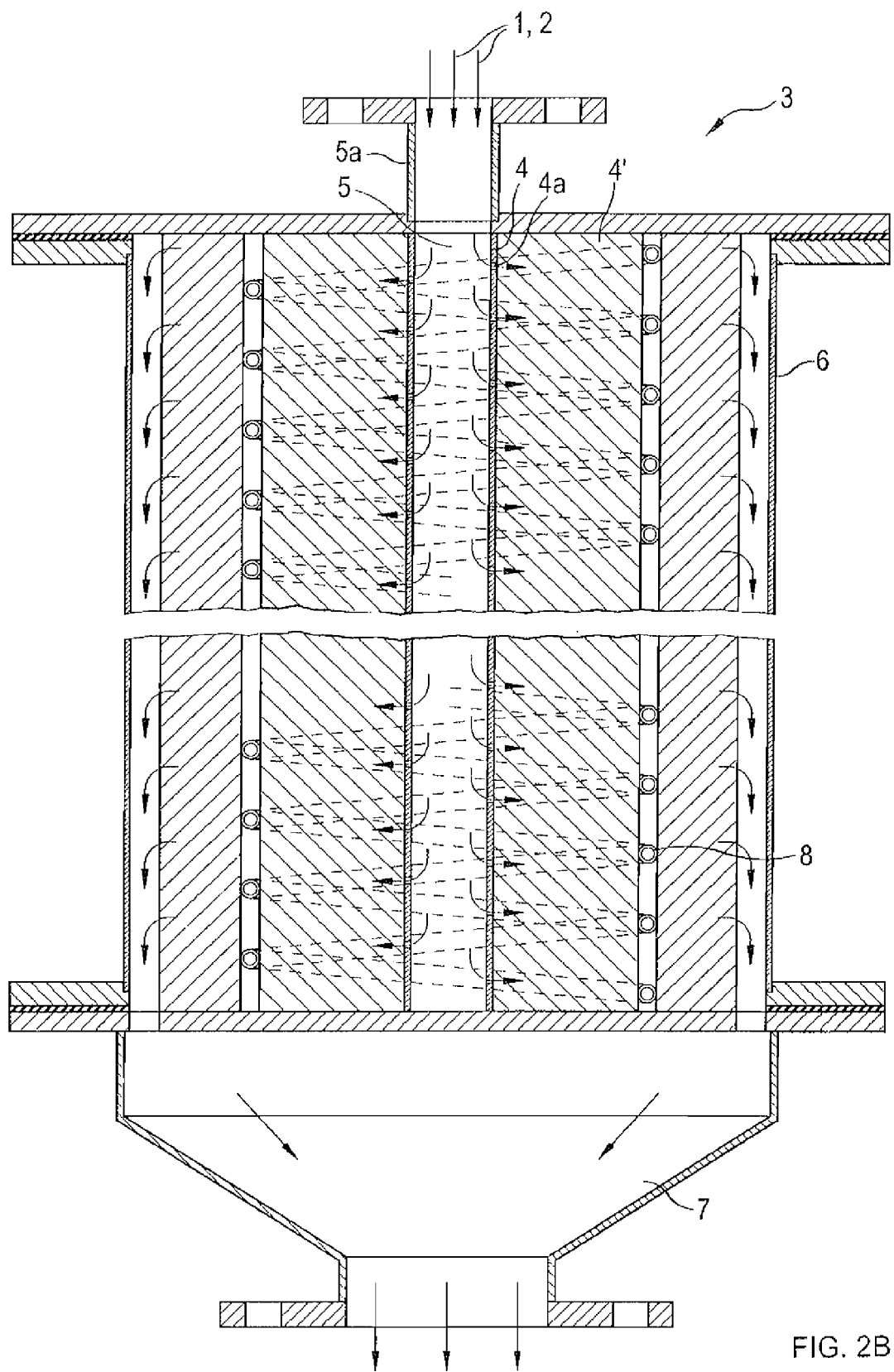
FIG. 2*b* A modified embodiment that shows a different way to stabilize the flame propagation.
Figure 3:
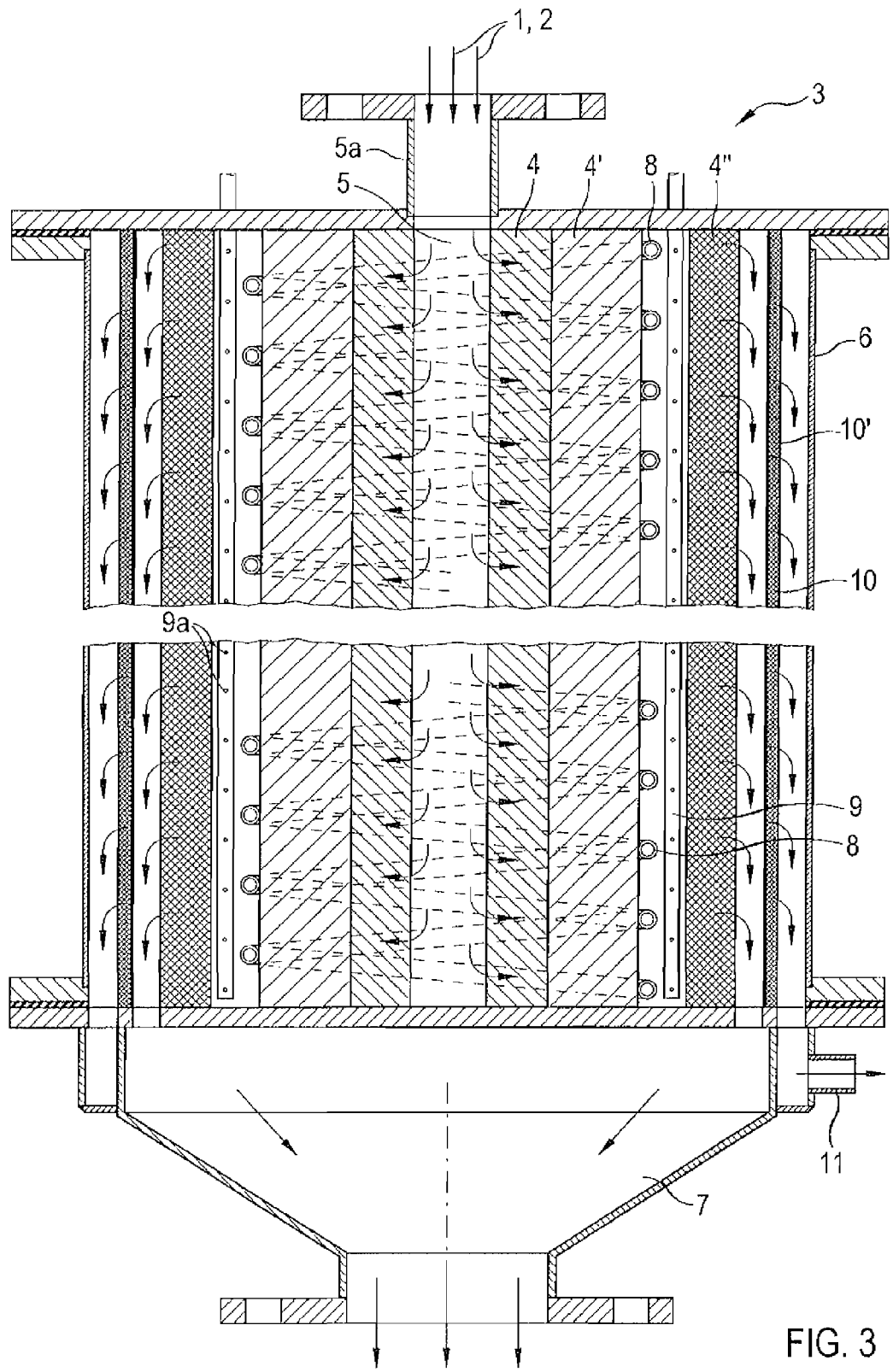
FIG. 3 An additional modified embodiment of the apparatus of FIG. 1 in a sectional view.

FIGS. 1 to 3 each show an example of an apparatus of the invention, configured as reactor 3 in order to generate hydrogen by means or the oxidation of fuels that contain chemically bound hydrogen. Reactor 3 has the shape of an extended pipe, into whose interior a first wall extends in the axial direction from a first porous material 4 and, adjacent to this first wall in the radially exterior direction, a second wall made of a second porous material 4' extends. The two walls of porous materials 4 and 4' concentrically surround a central chamber 5 that also extends axially and into which a connection fitting 5*a* is directed to introduce a fuel 1 as well as an oxidation agent 2. The directions in which the gases flow are indicated in the figures by arrows. The reactor 3 is defined on the exterior by an outer wall 6, which here is embodied as a double hallow tube through which, for example, a coolant can be passed.

In the simple embodiment shown in FIG. 1, only the first wall of porous material 4 and the second wall of porous material 4' are disposed inside the reactor 3. The first porous material is embodied in such a way that a Péclet number that ties below the critical Péclet number is established, so that no flame can develop within this wall. On the other hand, porous material 4' in the second wall has a Péclet number that is larger than the critical Péclet number, so that stable combustion can occur within this wall. The resulting product gases are discharged to the outside in the axial direction in the simple embodiment shown in FIG. 1 by means of a central manifold 7.

FIG. 2*a* shows a modified embodiment of the reactor of FIG. 1 which is also equipped with a tube 8 that is wound in the form of an extended spiral about the two inner walls of porous material 4, 4'. The tube 8 is used for the intermediate cooling of the reaction products that leave the second porous wall and that may also be necessary if a catalyst is used for the subsequent reaction of CO by means of steam. In addition, one can see in this figure a third wall of a porous material 4" that is disposed concentrically and at a given distance around the second wall. The further oxidation of CO to $CO_2$ takes place within this wall. In order to be able to supply additional reactants such as steam or oxygen-rich air for the reactions that take place in the third wall, additional small pipes are inserted in the space between the second and third wall, these pipes have holes 9*a* through which additional components can be mixed into the radially flowing gases. In the embodiment shown in FIG. 2*a*, the outer wall 6 is embodied as a simple tube.

An alternative stabilization mechanism is shown in FIG. 2*b*. In this figure, identical reference numbers are assigned to the elements, which are embodied in a manner analogous to that in FIGS. 1 and 2. This embodiment differs from that of FIG. 2*a* in that small holes 4*a* are present in the material 4 through which the fuel/gas can pass. As a result of the flow moving radially to the outside through the holes 4*a*, the flame cannot advance against the direction of flow.

The embodiment of FIG. 3 is further modified with respect to that of FIG. 2*a* in that between the outer wall 6 and the third wall of the porous material 4" a membrane 10, for example one made of palladium, is placed on a porous substrate 10' through which only the hydrogen that is generated can pass. In this way the hydrogen is separated from the other gases, and it flows between the membrane 10 and the outer wall 6 in the axial direction until it reaches a deflector 11 positioned here in the radial direction, by means of which it is discharged to the outside, while the other gases flow between the membrane and the third porous wall in the axial direction to the manifold 7 and from there to the outside.

Figure 4:
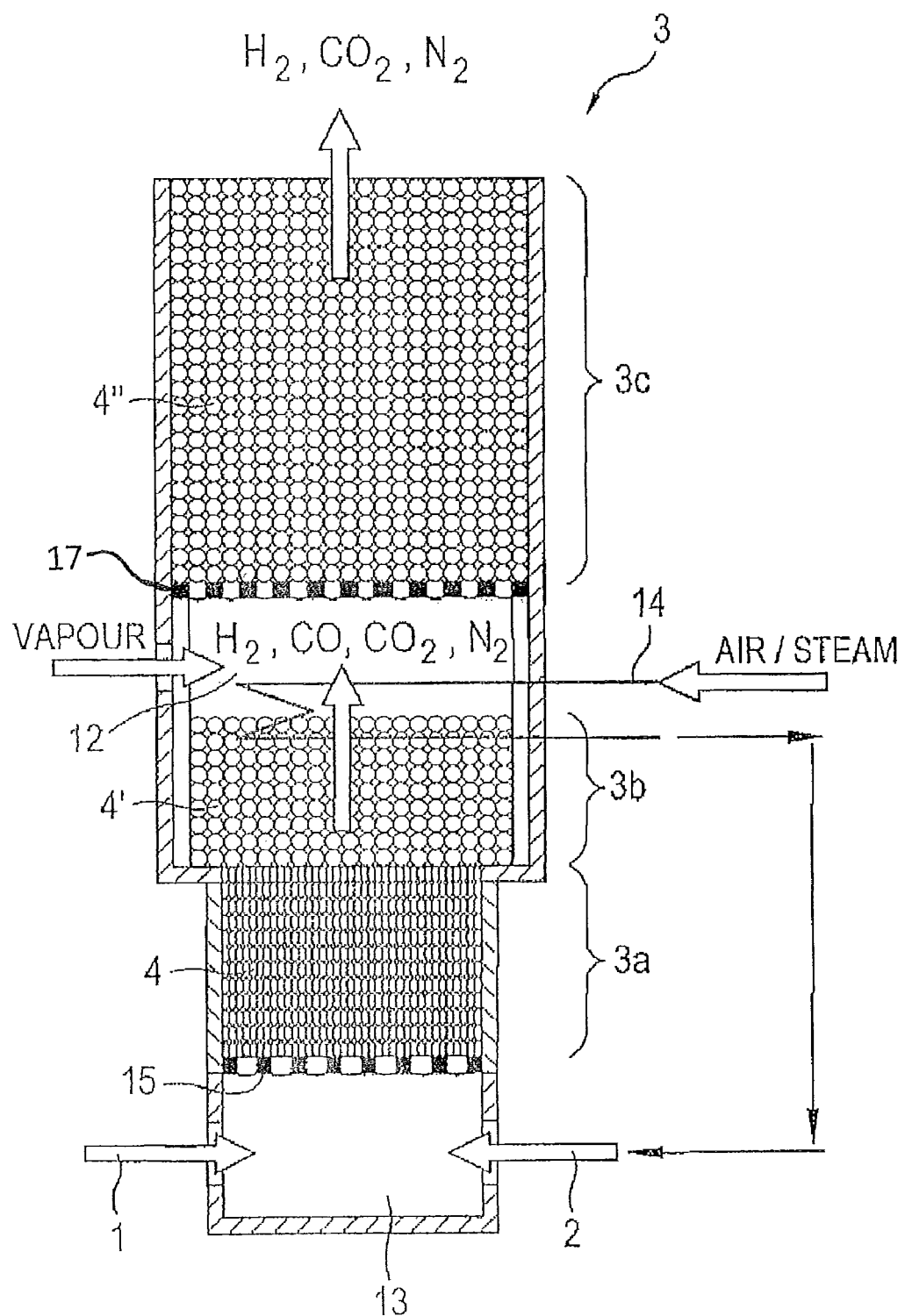
FIG. 4 A further apparatus of the invention for generating hydrogen through the oxidation of hydrocarbon-containing fuels.

Another type of reactor 3 is represented schematically in FIG. 4. In its interior, reactor 3 has a first zone 3*a* filled with the first porous material 4. Based on the already explained pore structure of the material 4, this zone functions as a flame barrier. Adjacent thereto in the direction of flow a second zone 3b is disposed, which is filled with porous material 4' whose Peclet number is greater than the critical Peclet number. Next to zone 3b there is located an intermediate space 12 into which steam can be fed, for example, as represented schematically in the drawing by an arrow. Zone 3c is adjacent to the intermediate space 12 and is filled with porous material 4". The oxidation of CO to $CO_2$ as well as the further generation of $H_2$ when steam is fed in occur in this zone. In the lower area of reactor 3, seen upstream from the flame barrier, there is located a premix chamber 13 through which the oxidation agent 2 as well as the fuel 1 enter the reactor 3. As can be seen in the figure, a heat exchange pipe 14 can be present in order to remove the heat arising from the partial oxidation. The heat given off by the reaction can be used in particular to preheat the oxidation agent, as is indicated in the figure by the thin arrows. In an alternative embodiment, which is not shown here, the heat exchanger pipe 14 can be routed in such a way that the heat given off by the reaction is carried to the downstream zone 3c in order to provide the activation energy for the reactions that occur there at the corresponding temperature level. Suitable grates 15, 17 are disposed inside the reactor 3 to support the porous materials 4, 4', 4".

Needless to say, in this apparatus or the invention it is also possible to separate the hydrogen gas by means of a membrane. Appropriate measures can easily be taken by a person of average skill in the art.

In performing the process of the invention in a reactor such as that shown in FIG. 4, methane and air were combusted at a fuel/air ratio of 0.5. The $CO/CO_2$ ratio measured at the gas outlet of the reactor was 2, corresponding to a hydrogen yield, based on the hydrocarbon fed into the reactor, of approximately 55%. By preheating the air to approximately 180° C. at $\lambda=0.4$, a soot-free product gas having a hydrogen yield of 70% was produced. She residence time within the reaction zone was only about 0.1 seconds. By contrast, prior-art processes such as that described in U.S. Pat. No. 4,699,631, require a substantially higher residence time, which can be up to 10 seconds long. Thus, the apparatus described here and the corresponding process achieve a significantly higher throughput with the same reactor dimensions. One of the reasons for this is the heat transfer properties that occur in a porous structure compared to those with a free-burning flame.

What is claimed is:

1. An apparatus to generate hydrogen by means of the oxidation of fuels that contain chemically bound hydrogen comprising:

a reactor that contains a first porous material and a second porous material, wherein the porosity of the first and second porous material changes in the direction which a flame develops to produce larger pores, the first and second porous materials are disposed in a first zone and a second zone, wherein the first and second zones are adjacent to and in contact with each other and seen in the direction of flow, and a third zone is provided downstream from the second zone and contains a third porous material, and further wherein an intermediate space into which a pipe extends to introduce at least one of a gas and steam is provided between the second and third zones.

2. The apparatus of claim 1, wherein the second and third porous materials of at least one of the second and third zone comprises catalytically active structures.

3. The apparatus of claim 1, further comprising a heat exchanger positioned upstream.

4. An apparatus to generate hydrogen by means of the oxidation of fuels that contain chemically bound hydrogen comprising:

a reactor that contains a first bed formed of first porous materials and a second bed formed of a second porous materials, wherein the porosity of the first and second porous material changes in the direction which a flame develops to produce larger pores, the first and second porous beds are disposed in a first zone and a second zone, respectively, wherein the first and second zones are adjacent to and in contact with each other and seen in the direction of flow, and a third zone is provided downstream from the second zone and contains a third bed of a third porous materials, and further wherein an intermediate space into which a pipe extends to introduce at least one of a gas and steam is provided between the second and third zones.

5. An apparatus to generate hydrogen by means of the oxidation of fuels that contain chemically bound hydrogen comprising:

a reactor that contains a first porous material that is disposed in layers and a second porous material that is disposed in layers, wherein the porosity of the first and second porous material changes in the direction which a flame develops to produce larger pores, the first and second porous materials are disposed in a first zone and a second zone, wherein the first and second zones are adjacent to and in contact with each other and seen in the direction of flow, and a third zone is provided downstream from the second zone and contains a third porous material that is disposed in layers, and further wherein an intermediate space into which a pipe extends to introduce at least one of a gas and steam is provided between the second and third zones; wherein a perforated member that is a separate structure relative to the third porous material is disposed adjacent and in contact with the third porous material and is downstream of the second porous material so as to space the third porous material from the second porous material so as to form the intermediate space.

* * * * *